Aug. 14, 1923.
F. T. O'GRADY
1,465,053
COLOR MOTION PICTURE PHOTOGRAPHY
Filed Nov. 26, 1919
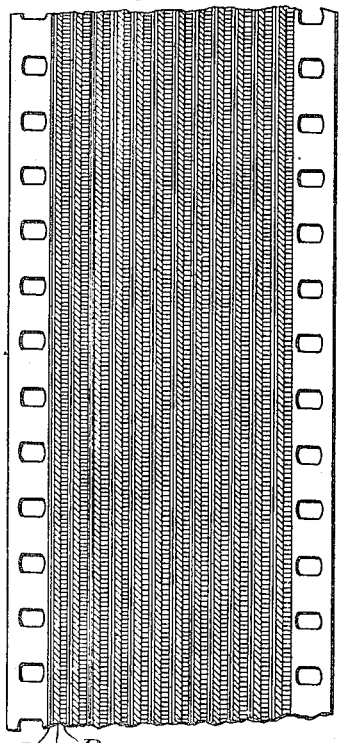
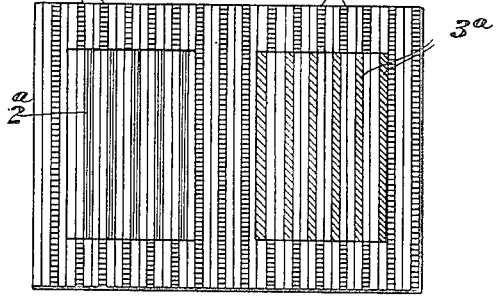
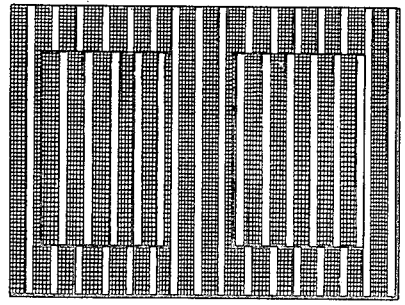
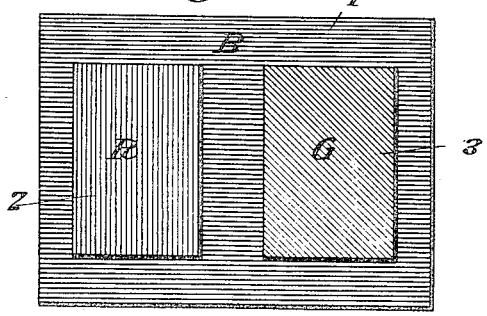
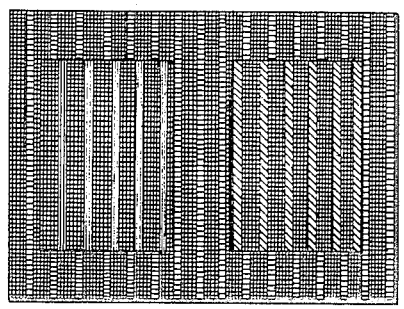
Inventor
Frederick T. O'Grady
By [signature]
Attorneys Patented Aug. 14, 1923.

1,465,053

UNITED STATES PATENT OFFICE.

FREDERICK THOMAS O'GRADY, OF FLUSHING, NEW YORK.

COLOR MOTION-PICTURE PHOTOGRAPHY.

Application filed November 26, 1919. Serial No. 340,924.

*To all whom it may concern:*

Be it known that I, FREDERICK THOMAS O'GRADY, a citizen of the United States, and resident of Flushing, in the county of Queens and State of New York, have invented certain new and useful Improvements in Color Motion-Picture Photography, of which the following is a specification.

This invention relates to a method for the production, by photography, of motion pictures in natural colors by the use of single emulsion coated motion picture films.

The methods of color motion picture photography heretofore used, involved, or required the use of, complicated and extensive devices and apparatus in the preparation of the film and in the projection of the pictures. The cameras and projection apparatus used in connection with these old methods are provided with special attachments for color-filters. One of the best known of these old methods requires that double the number of exposures shall be made as in the ordinary monochrome picture production methods, and obviously this requires double the length of film. This method also requires that the film shall have, during the operation of both taking and projecting the pictures, twice the speed as the ordinary monochrome motion picture film. Such increase in speed involves prohibitive expense and complicated and expensive cameras and projectors for the manipulation of the films; also this rapid changing from one color to the other causes color pulsation and fringing of color, which in turn when viewed on the screen, cause considerable optical discomfort to the observer.

Other methods involve the use of double emulsion coated films, which have to undergo the double operation of printing, superimposing of the two images, immersion in numerous color tinting and toning solutions, water-proofing etc., the results of which are not only unsatisfactory, but entirely uncommercial.

In carrying out this invention a standard single emulsion coated photographic negative film which has been rendered sensitive to all the colors of the spectrum, is used. Such films are known as panchromatic emulsion films. To this negative film, on the emulsion side are applied color-filters. The film is then exposed in the usual way in a standard motion picture camera and a multiplicity of exposures are made in sequence, the exposed areas being close together and side by side throughout the length of the film. The color-filters are then washed from the film and the negative then developed. From the negative thus produced a positive print is made on a standard positive film in the ordinary way on any standard motion picture printing machine. After this positive print has been developed and dried the color-filters are applied thereto in positions corresponding identically to the positions which said color-filters occupied on the original negative film. After the color-filters have been applied to the standard positive film, the film may be used in the ordinary standard projecting apparatus without the use of any additional attachment for color-filters or screens, and the film may be moved through the projecting machine at the usual or standard speed.

One of the main objects of this invention is to provide a method of making motion pictures in natural colors wherein a standard panchromatic negative, and a single emulsion coated positive film may be used, whereby the actual photographing and projection may be done on any standard motion picture camera and projector, at the standard speed of sixteen pictures per second.

There are other important objects and advantages of the invention which will appear hereinafter.

In the drawings:

Fig. 1 is a detail view of a portion of a negative film ruled with the color-filter lines, said lines being greatly exaggerated in width;

Fig. 2 a detail view of three plates to be photographed, said plates being colored blue, red and green;

Fig. 3 a detail view of a part of a negative film as it appears after photographing the colored plates illustrated in Fig. 2;

Fig. 4 a detail view of a part of a positive film printed from the negative film shown in Fig. 3; and Fig. 5 is a similar view of the positive film shown in Fig. 4 after the color-filter lines have been marked thereon to correspond with the original color-filter markings of the negative film.

In carrying this invention into effect a standard single emulsion coated negative film is marked longitudinally with a multiplicity of fine color-filter lines. As indicated in Fig. 1 these color-filter lines run side by side close together and cover the entire emulsion coated portion of the film. Preferably these color-filters are red, green and blue or blue-violet, as indicated by the letters R, G, B in Fig. 1. These color-filters are repeated in the stated sequence throughout the width of the film. Preferably these color-filters are very fine, approximately one thousandth of an inch wide so that there will be approximately one thousand of these color-filters to each inch of film measured transversely. These color-filter lines are ruled or marked directly on the emulsion side of the film; and as hereinbefore set forth a single emulsion coated panchromatic negative film is used.

The color-filter lines may be marked upon the film by any suitable means, but preferably by some means having properly spaced ruling or marking devices. These devices may be mounted in any suitable manner. It is thought unnecessary to illustrate and describe in detail a marking machine, as any suitable machine may be used for that purpose.

A negative film marked with the filters may be exposed in an ordinary motion picture camera and a multiplicity of picture areas are exposed, said picture areas being arranged in sequence and close together side by side throughout the length of the exposed film, the rate of exposure being the same as when a plain monochromatic single emulsion coated negative film is used. It is unnecessary to use any additional color-filters or screens or other devices except that it is of advantage to use a compensating yellow color-filter capped either on the front or rear of the lens, or between the lens combinations. This yellow color-filter is used for the purpose of absorbing the excessive ultra-violet rays; it also serves as means for compensating for unequal panchromatic values of the film emulsion. The balancing of unequal panchromatic values can be also nicely adjusted by varying the depth of or the width of the color-filter lines.

In exposing the negative film in the camera the photographic images are affected by the color-filter lines on the film in such a way that the colors of the object photographed are filtered, that is to say, are permitted to pass only through their respective color-filters, so that the red rays will pass only through the red color-filters, green rays only through the green color-filters, while blues and blue-violet rays will pass only through the blue or blue-violet color-filters. The result is that each particular color after exposure of the film in the camera, is represented by a series of graduated dark lines on the emulsion of the film, with intervening clear spaces where the filter lines complementary to the color photographed has prevented exposure of the emulsion. This will be readily understood by reference to Figs. 2 and 3. Fig. 2 illustrates a blue background 1, a red plate 2 and a green plate 3, these two plates being placed against the blue background. Fig. 3 represents a photographic color record of the blue background and the red and green plates illustrated in Fig. 2. The dark lines 2ᵃ in Fig. 3 represent exposure passed through the red filter lines, that is to say, said dark lines 2ᵃ represent the effect on the emulsion of the red rays from plate 2 which have passed through the red filter lines on the negative film. The dark lines 3ᵃ represent the effect on the emulsion of the green rays from the plate 3 which have passed through the green filter lines on the negative film; and the dark lines 1ᵃ represent the effect of the blue rays that have passed through the blue or blue-violet filter lines on the negative film from the blue background 1. The clear spaces intervening between the dark lines 1ᵃ represent the spaces on the film that were covered by the red and green filter lines. The clear spaces between the dark lines 2ᵃ represent the spaces on the film that were covered by the blue and green color-filter lines on the negative film while the clear spaces between the dark lines 3ᵃ represent the spaces that were covered by the blue and red filter lines.

After the negative film is exposed it is washed in running water or other suitable liquid to completely remove the color-filters. This must be done before the negative is developed. This is most important for the reason that positive films are made from the negative by printing in the ordinary way as in making monochrome prints. If the filters were not washed from the negative they would interfere with the action of the light used in printing, and prevent it passing through the color-filter lines. After the development a photograph of the plates as shown in Fig. 2 will appear as shown in Fig. 3. It will, of course, be understood that in the drawings the width of the color-filter lines is greatly exaggerated and that on a negative film of normal size these lines will be very fine. After it is developed the negative film has the appearance of a black and white negative but is lined to correspond to the lines of the color-filters through which the exposure was made. It also possesses latent color values of the object photographed, in monochrome form. These lines, however, are so fine as to be hardly perceivable with the naked eye. Of course, it is manifest that these lines run longitudinally through the length of the film and occur in each exposure or picture on the film.

After the negative film is developed a positive print is made from it in the ordinary way on any standard motion picture machine, using standard positive films, a multiplicity of picture areas being thus printed, said picture areas being arranged in sequence close together and extending throughout the length of the exposed film. A positive film print made from the negative shown in Fig. 3 will appear as shown in Fig. 4. The emulsion will be affected by the light passing through the clear spaces of the negative so that dark spaces will be produced in the printing corresponding to the light spaces of the negative. The dark spaces on the negative will hold back light resulting in clear spaces in the positive print. This is clearly indicated in Fig. 4. When the positive print is developed it is then passed through the color applying machine in precisely the same way that the negative film was passed and the color-filters are placed on the positive film. In the development of the negative film there will be a certain minute transverse shrinkage. In the development of the positive film there also will be a minute transverse shrinkage. The devices for applying the color-filter lines to the positive film must compensate for the minute transverse shrinkage of the films during development and drying. In applying the color-filter lines to the positive print, the ruling devices are so adjusted that their particular color lines correspond and apply themselves to their particular color representations in the positive print, as follows: The blue filter lines will cover the clear spaces 1ª in the blue background; the red filter lines will cover the clear spaces formed by the dark lines 2ª and the green filter lines will cover the clear spaces formed by the dark lines 3ª. When the positive film has been lined or marked with the color-filters it has the appearance illustrated in Fig. 5. The positive film thus produced can be projected on a suitable screen by means of any standard motion picture machine without additional filters or screens or other attachments and may be run at the same rate of speed as standard monochrome motion picture records, and the pictures on the viewing screen will be in substantially the natural colors of the object photographed and with a marked stereoscopic effect. This stereoscopic effect results from the opaque lines in the positive film and gives to the photographed object an appearance of relief and solidity. This is a marked improvement over the ordinary monochrome moving picture, and is in addition to the color effect secured.

The color filter lines are straight and parallel and extend longitudinally of the film in the direction of its movement through the camera, printer or projecting machine, and the said lines extend continuously over a series of pictures upon the film. There is a distinct advantage in such an arrangement of the color filter lines inasmuch as it avoids an annoying and injurious effect upon the eyes of an observer such as would be caused by any other arrangement of the lines. In the longitudinal travel of motion picture films through the camera or the printer the said films are carefully guided against lateral displacement and as a consequence, most of the successive picture areas are properly placed in alinement upon the films. It is impossible on the other hand to evenly space the picture areas along the film owing to several causes such as the stretching of the film and wear in the connections between the film and the feeding mechanism. The film may also be subjected to stretching and inaccurate feeding as it is passed through the projecting machine and these defects will increase with repeated use of the film. The picture when projected is therefore, constantly changing its vertical position slightly, or vibrating up and down upon the screen. Assuming that the color filter lines were arranged upon the film in other ways than the one shown, as for instance, transversely or obliquely of the film, it is obvious that the color lines which are projected upon the screen will constantly vibrate up and down as the picture vibrates and subject the observer's eyes to an annoying and possibly injurious strain, the colors rendering the vibration particularly trying to the eyes. My arrangement of the color filter lines so as to extend vertically and continuously through a series of picture areas in the direction of their movement overcomes this difficulty owing to the fact that the color lines projected upon the screen from one picture area will occupy the same lateral positions upon the screen that they occupied when projected from a preceding picture area and the said lines will vibrate only in the direction of their length, which vibration will impose no strain upon the eyes.

While it is preferred to use the three color-filters namely, red, green and blue or blue-violet, it is manifest that good results can be obtained by the use of other color combinations. It is obvious that the color-ruling machine may be readily changed to adapt it for placing the desired number of color-filter on films.

What I claim is:—

1. The method of making positive films for the projection of motion pictures in colors consisting in first marking on the emulsion side of a negative film a multiplicity of fine longitudinally extending straight, parallel color filter lines, said color filter lines extending over a multiplicity of picture areas in the direction of their movement and being arranged side by side and covering the entire emulsion coat, exposing the filter area of the said marked negative film in a camera to obtain a series of images thereon in sequence on a multiplicity of picture areas, washing the color filter lines from the exposed negative film and then developing said film to fix the images thereon, making a print from said negative film on a positive film to produce the sequence of pictures arranged close together and covering a multiplicity of picture areas arranged longitudinally of the film, and developing said positive film to fix the images thereon and then marking on the positive film longitudinally extending color filter lines, said lines being continuous over a multiplicity of picture areas arranged close together and in sequence longitudinally of the film and corresponding exactly in number and position and character with the color filter lines marked originally on the negative film.

2. The method of making positive films for the projection of motion pictures in colors consisting in first providing a negative film with a multiplicity of fine longitudinally extending color filter lines, said color filter lines being straight and parallel and extending over a multiplicity of picture areas in the direction of their movement and being arranged side by side and covering the entire emulsion coat, exposing the filter area of the said negative film in a camera to obtain a series of images thereon in sequence on a multiplicity of picture areas, removing the color filters from the exposed negative film and then developing said film to fix the images thereon, making a print from said negative film on a positive film to produce the sequence of pictures arranged close together and covering a multiplicity of picture areas arranged close together and covering a multiplicity of picture areas arranged longitudinally of the film, and developing said positive film to fix the images thereon and then marking on the positive film longitudinally extending color filter lines, said lines being continuous over a multiplicity of picture areas arranged close together and in sequence longitudinally of the film and corresponding exactly in number and position and character with the color filter lines provided originally for the negative film.

3. A positive film for motion picture projection having straight, parallel color value lines formed in the emulsion coating during the process of printing, said lines running longitudinally of the film side by side and being continuous over a multiplicity of picture areas arranged close together and in sequence longitudinally of the film and extending in the direction of its movement, and color filter lines marked on the said emulsion coating of the film directly over and superimposed upon the color value lines formed in the emulsion, each of said color filter lines being continuous and extending over a multiplicity of picture areas and corresponding in color to the color value lines covered by it.

This specification signed this twenty-fourth day of November, A. D. 1919.

FREDERICK THOMAS O'GRADY.